(12) United States Patent
Mishra

(10) Patent No.: US 10,929,108 B2
(45) Date of Patent: Feb. 23, 2021

(54) METHODS AND SYSTEMS FOR VERIFYING A SOFTWARE PROGRAM

(71) Applicant: SIEMENS INDUSTRY SOFTWARE NV, Leuven (BE)

(72) Inventor: Sanjit Mishra, Chennai (IN)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 0 days.

(21) Appl. No.: 16/481,905

(22) PCT Filed: Sep. 5, 2017

(86) PCT No.: PCT/EP2017/072187
§ 371 (c)(1),
(2) Date: Jul. 30, 2019

(87) PCT Pub. No.: WO2018/141424
PCT Pub. Date: Aug. 9, 2018

(65) Prior Publication Data
US 2019/0377556 A1    Dec. 12, 2019

(30) Foreign Application Priority Data

Feb. 1, 2017 (IN) .............................. 201731003703

(51) Int. Cl.
*G06F 8/35* (2018.01)
*G06F 11/07* (2006.01)
*G06F 11/36* (2006.01)

(52) U.S. Cl.
CPC ............ *G06F 8/35* (2013.01); *G06F 11/0766* (2013.01); *G06F 11/3604* (2013.01)

(58) Field of Classification Search
CPC .......... G06F 8/35; G06F 9/44; G06F 11/0766; G06F 11/3604; F06F 11/07
See application file for complete search history.

(56) References Cited

U.S. PATENT DOCUMENTS

2010/0325620 A1* 12/2010 Rohde ................. G06F 11/3604
                                                                   717/154
2014/0282406 A1   9/2014 Narasimhan
2018/0129581 A1*  5/2018 Abadi ................. G06F 11/3608

FOREIGN PATENT DOCUMENTS

CN    102419709 A    4/2012
CN    106557413 A    4/2017
(Continued)

OTHER PUBLICATIONS

Alex Groce et al., From Scripts to Specifications the Evolution of a Flight Software Testing Effort, ACM, 2010, retrieved online on Nov. 1, 2020, pp. 129-138. Retrieved from the Internet: <URL: https://ieeexplore.ieee.org/stamp/stamp.jsp?tp=&arnumber=6062146>. (Year: 2010).*

(Continued)

*Primary Examiner* — Hanh Thi-Minh Bui
(74) *Attorney, Agent, or Firm* — Lempia Summerfield Katz LLC

(57) ABSTRACT

Methods and Systems for verifying a software program in an integrated-development environment are disclosed. In one embodiment, a method of verifying the software program in the integrated-development environment includes generating a source code of a software program in comprising logging statements based on a specification of the software program. Furthermore, the method includes executing the source code with the logging statements and generating one or more log files during execution of the source code based on the logging statements. Moreover, the method includes generating a representation of the source code in a modeling language based on the one or more log files. The method includes verifying compliance of the source code with the (Continued)

specification by comparing the representation of the source code in the modeling language with the specification in the modeling language.

9 Claims, 5 Drawing Sheets

(56) References Cited

FOREIGN PATENT DOCUMENTS

| | | |
|---|---|---|
| CN | 107148615 A | 9/2017 |
| JP | 2004038741 A | 2/2004 |
| JP | 2009295021 A | 12/2009 |
| WO | WO2006038394 A1 | 4/2006 |

OTHER PUBLICATIONS

Clinque, Marcello, Domenico Cotroneo, and Antonio Pecchia. "Event logs for the analysis of software failures: A rule-based approach" IEEE Transactions on Software Engineering 39.6 (2012): 1-16.

PCT International Written Opinion of the International Searching Authority dated Nov. 16, 2017, for corresponding PCT/EP2017/072187.

* cited by examiner

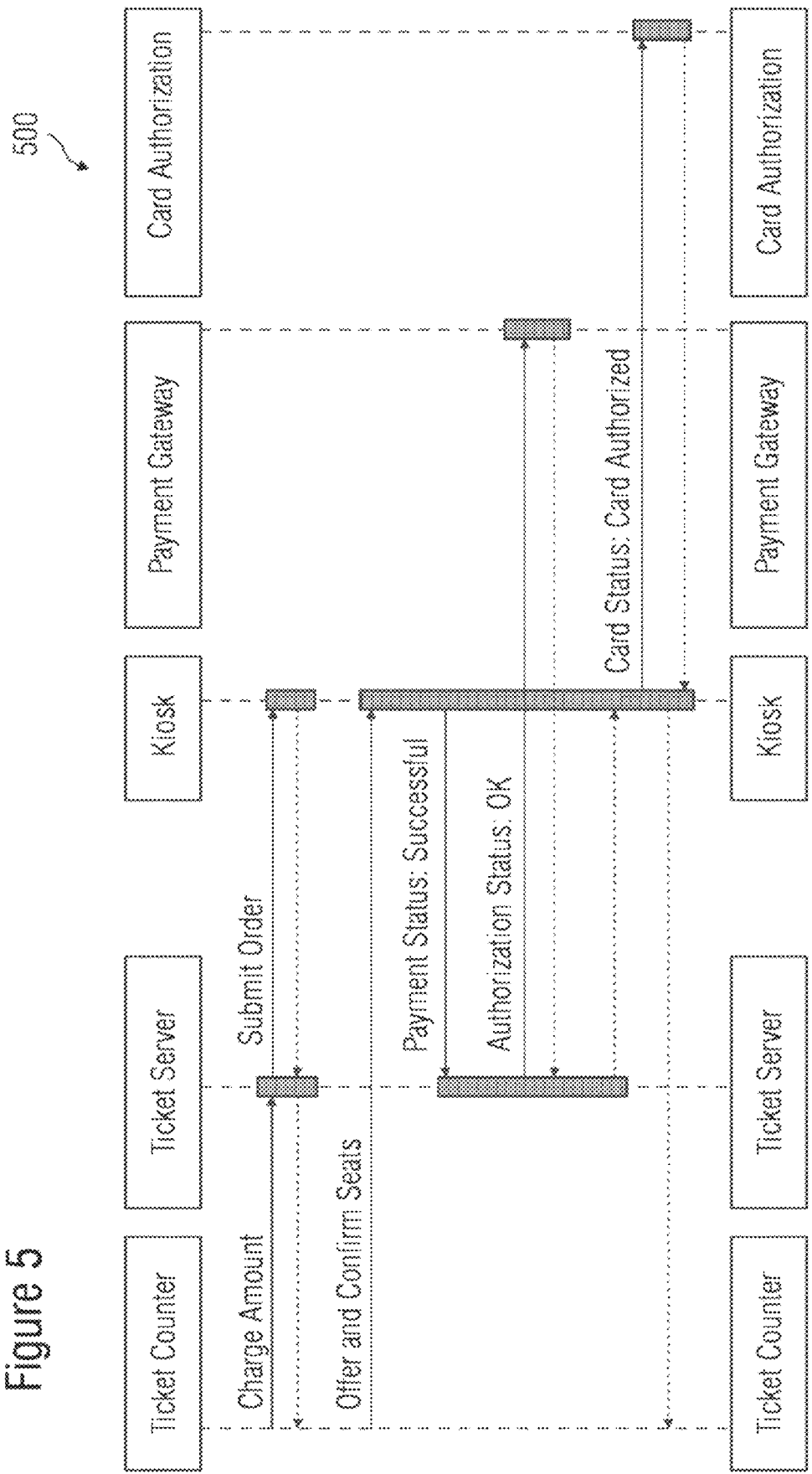

METHODS AND SYSTEMS FOR VERIFYING A SOFTWARE PROGRAM

The present patent document is a § 371 nationalization of PCT Application Serial No. PCT/EP2017/072187, filed Sep. 5, 2017, designating the United States, which is hereby incorporated by reference, and this patent document also claims the benefit of Indian Patent Application No. 201731003703, filed Feb. 1, 2017, which is also hereby incorporated by reference.

TECHNICAL FIELD

The present disclosure generally relates to the field of model-driven software development, and more particularly relates to methods and systems for verifying software program in an integrated-development environment.

BACKGROUND

An integrated-development environment (IDE) is a software application that provides comprehensive facilities to software engineers for software development. Some integrated-development environments enable development of software using formal structured, top-down development approaches such as model-driven software development. Based on the model-driven software development approach, software engineers may use an integrated-development environment to model software as per a specification using unified modeling language (UML) diagrams. Exemplary unified modeling language diagrams may include sequence diagrams which specify behavior of a system in a chronological sequence of interactions between various elements that make up the system in response to external event. The software engineer develops a software program using the sequence diagrams. A peer reviewer may inspect source code of the software program and confirm that the software program complies with the specification.

The software program may be developed using a procedural programming language such as the 'C' programming language. In such a case, the software engineer understands the sequence diagram and implements desired behavior as a software program in the 'C' programming language. However, the software program may not have a one-to-one correspondence with the sequence diagram. Thus, it becomes a time consuming and cumbersome task for the peer reviewer to inspect the source code of the software program and confirm compliance with the sequence diagram.

Document Marcello Cinque et al., "Event Logs for the Analysis of Software Failure: A Rule-Based Approach," IEE TRANSACTIONS ON SOFTWARE ENGINEERING, IEEE SERVICE CENTER, LOS ALAMOS, Calif., vol. 39, no. 6, 1 Jun. 2013, pages 806-821 addresses limitations of current logging mechanisms and proposes a rule-based approach to make logs effective for analyzing software failures. The approach leverages artifacts produced at system design time and puts forth a set of rules to formalize the placement of the logging instructions within the source code.

BRIEF SUMMARY

Methods and systems for verifying a software program in an integrated-development environment is disclosed. In one aspect, a computer-implemented method of verifying a software program in an integrated development environment includes generating, by a data processing system, a source code of a software program including logging statements based on a specification of the software program. The logging statements are appended at one or more locations in the source code of the software program based on metadata tagged in the specification of the software program, wherein the specification of the software program is represented in a modeling language. The method includes executing the source code with the logging statements and generating one or more log files during execution of the source code based on the logging statements. The method includes generating a representation of the source code in a modeling language using the one or more log files. Moreover, the method includes verifying the source code of the software program using the representation of the source code in the modeling language.

In another aspect, a data processing system includes a processing unit, and a memory coupled to the processing unit. The memory includes a model-driven development module stored in the form of machine-readable instructions and executable by the processing unit. The model-driven development module is configured to generate a source code of a software program including logging statements based on a specification of the software program. The logging statements are appended at one or more locations in the source code of the software program based on metadata tagged in the specification of the software program, wherein the specification on the software program is represented in a modeling language. The model-driven development module is configured to execute the source code with the logging statements and generate one or more log files during execution of the source code based on the logging statements. Moreover, the model-driven development module is configured to generate a representation of the source code in a modeling language using the one or more log files. Further, the model-driven development module is configured to verify the source code of the software program using the representation of the source code in the modeling language.

In yet another aspect, a non-transitory computer-readable storage medium, having instructions stored therein, which when executed by a data processing system, cause the data processing system to perform a method of verifying a software program in an integrated-development environment described above.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following description when considered in connection with the accompanying drawings:

FIG. 5 is a schematic representation of an exemplary sequence diagram which is generated based on information logged during execution of a C-code for a ticketing system.

DETAILED DESCRIPTION

Figure 1:
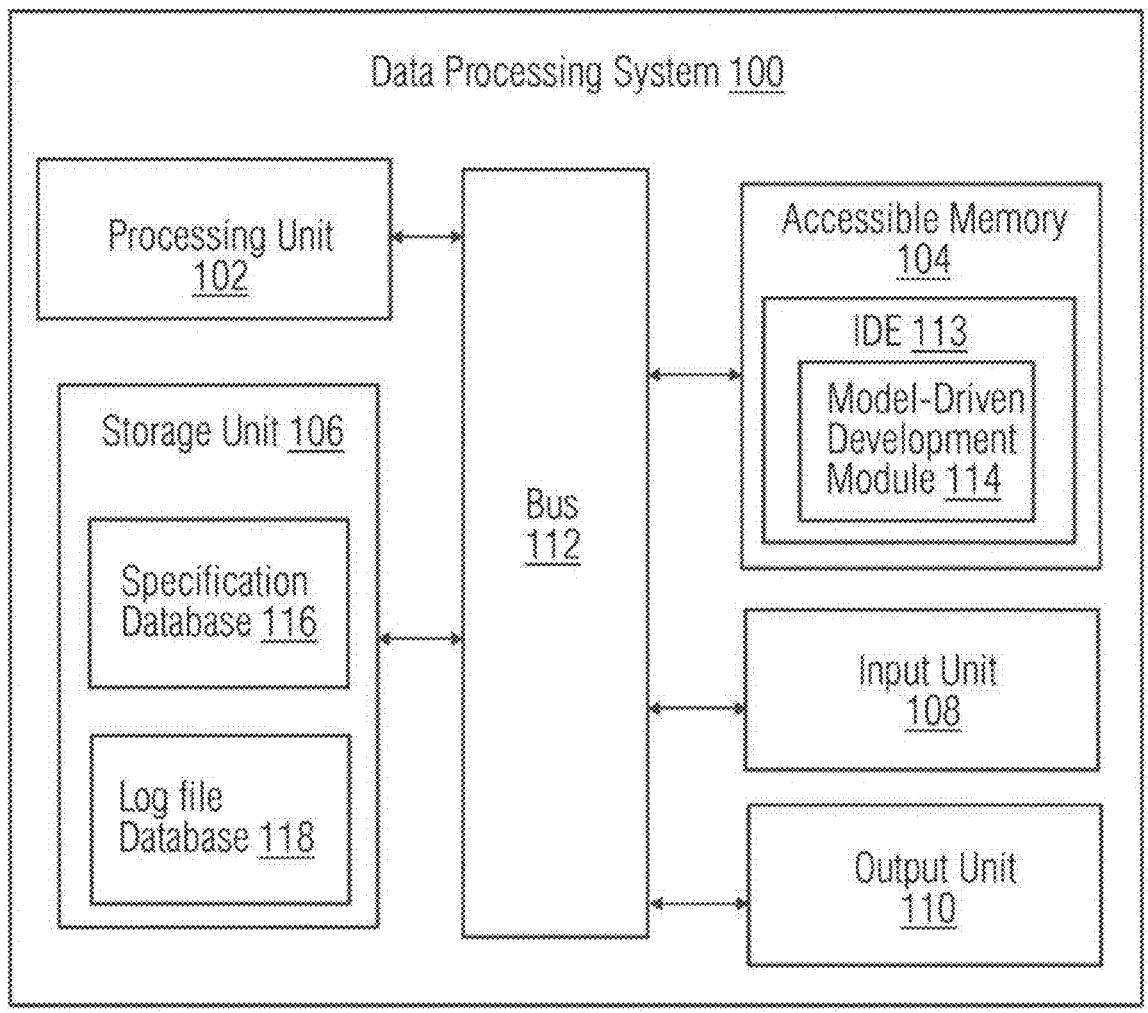
FIG. 1 illustrates a block diagram of a data processing system in which an embodiment can be implemented.

A method and system for verifying a software program in an integrated-development environment is disclosed. Various embodiments are described with reference to the drawings, wherein like reference numerals are used to refer to like elements throughout. In the following description, numerous specific details are set forth in order to provide a thorough understanding of embodiments of the present disclosure. It will be apparent to one skilled in the art, that these specific details need not be employed to practice embodiments of the present disclosure. In other instances, well known materials or methods have not been described in detail in order to avoid unnecessarily obscuring embodiments of the present disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the present disclosure.

FIG. 1 illustrates a block diagram of a data processing system 100 in which an embodiment can be implemented, for example, as a data processing system particularly configured by software or otherwise to perform the processes as described herein. The data processing system 100 may be a personal computer, a laptop computer, a tablet, smart phone, and the like. In FIG. 1, the data processing system 100 includes a processing unit 102, an accessible memory 104, a storage unit 106, an input unit 108, an output unit 110, and a bus 112.

The processing unit 102, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processing unit 102 may also include embedded controllers, such as generic or programmable logic devices or arrays, application specific integrated circuits, single-chip computers, and the like.

The memory 104 may be non-transitory volatile memory and non-volatile memory. The memory 104 may be coupled for communication with the processing unit 102, such as being a computer-readable storage medium. The processing unit 102 may execute machine-readable instructions and/or source code stored in the memory 104. A variety of machine-readable instructions may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes an integrated-development environment (IDE) 113. The IDE 113 includes a model-driven development module 114 stored in the form of machine-readable instructions on any of the above-mentioned storage media and may be in communication with and executed by the processing unit 102.

When executed by the processing unit 102, the model-driven development module 114 causes the processing unit 102 to generate a source code of a software program including logging statements using a specification of the software program. The specification of the software program is represented in a modeling language. For example, the specification of the software program is represented using domain specific languages (DSLs). The software program may be, for example, developed for an embedded system (e.g., a cruise control system) for a system (e.g., car). The software program, when deployed, would enable a system to perform desired functionality (e.g., to enable auto-cruise mode in a car). The model-driven development module 114 causes the processing unit 102 to generate log files during execution of the source code based on the logging statements and generate a representation of the source code in the modeling language using the log files. Also, the model-driven development module 114 causes the processing unit 102 to verify compliance of the source code with the specification by comparing the representation of the source code in the modeling language with the specification in the modeling language. The model-driven development module 114 causes the processing unit 102 to alter the source code of the software program based on the outcome of the verification. Method steps performed by the processing unit 102 to achieve the above functionality are described in greater detail in FIG. 3.

The storage unit 106 may be a non-transitory storage medium which stores a specification database 116 and a log file database 118. The specification database 116 stores the specification of the software program. For example, the specification of the software program is represented using unified modeling language diagrams, such as sequence diagrams. The log file database 118 stores log files generated during execution of the source code of the software program. Each log file contains information representing a chronological sequence of interactions between elements (e.g., components and/or objects) of a system (e.g., car) which is operated using the software program.

The input unit 108 may include input devices a keypad, touch-sensitive display, camera (such as a camera receiving gesture-based inputs), etc. capable of receiving one or more input signals, such as user commands to generate and verify a software program in the IDE 113. The output unit 110 may be a display unit for displaying a graphical user interface which visualizes the representation of the source code in the modeling language and result of verification of the source code. The output unit 110 also provides a graphical user interface which enables the users to interact with the IDE 113. For example, the graphical user interface enables the users to alter the source code such that the source code complies with the specification. The bus 112 acts as interconnect between the processing unit 102, the memory 104, the storage unit 106, the input unit 108, and the output unit 110.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Disclosed embodiments provide systems and methods that verify a software program in an integrated-development environment. In particular, disclosed techniques may generate a source code of the software program with logging statements, generate log files during execution of the source code based on the logging statements, generate a representation of the source code in a modeling language based on the log files, and verify the source code using the representation of the source code in the modeling language.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 100 may conform to any of the various current implementation and practices known in the art.

Figure 2:
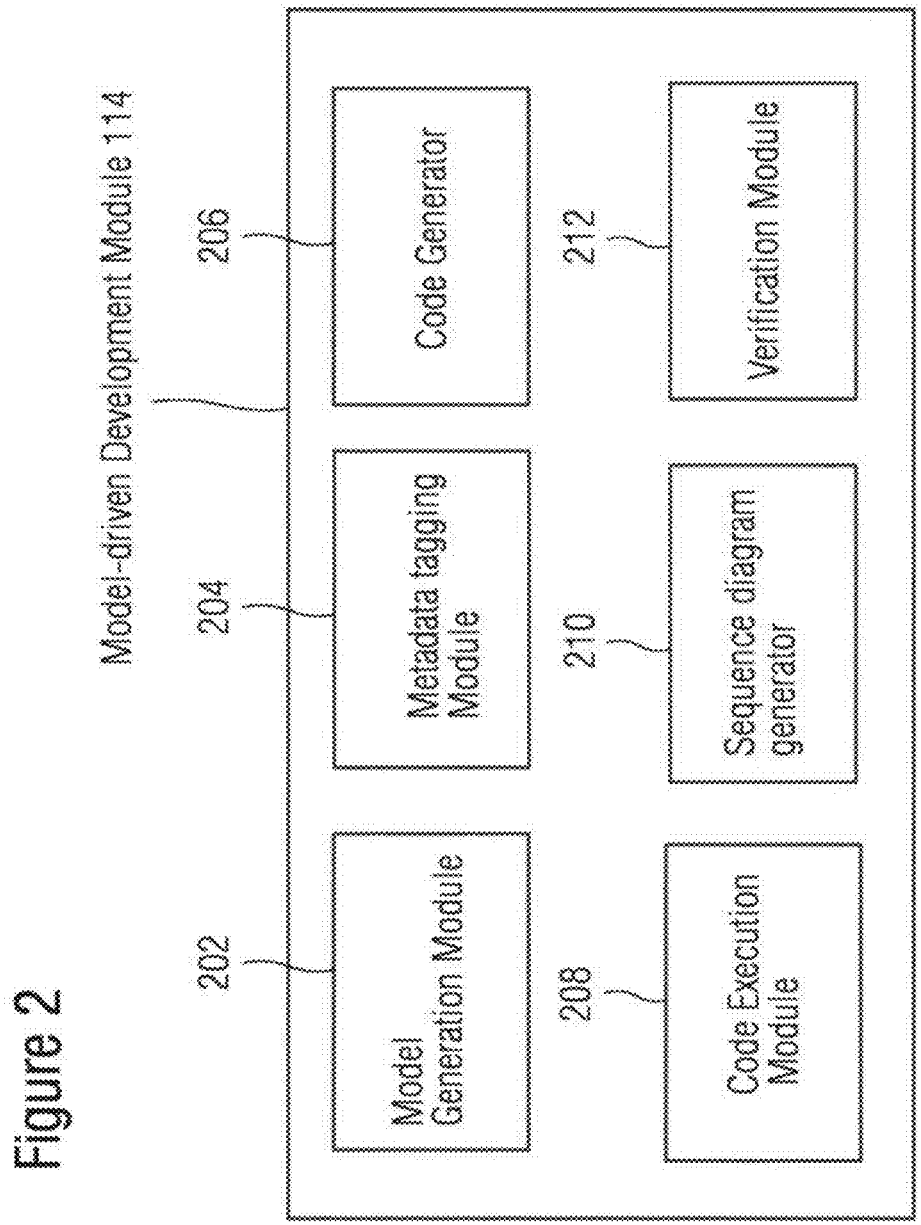
FIG. 2 is a block diagram illustrating various modules of a model-driven development module of FIG. 1, according to an embodiment.

FIG. 2 is a block diagram illustrating various modules of the model-driven development module 114 of FIG. 1, according to an embodiment. The model-driven development module 114 includes a model generation module 202, a metadata tagging module 204, a code generator 206, a code execution module 208, a sequence diagram generator 210, and a verification module 212.

The model generation module 202 is configured to generate a unified modeling language (UML) diagram of a specification of a software program. In some embodiments, the model generation module 202 is configured to generate a sequence diagram representing the specification of the software program to be developed. The sequence diagram specifies behavior of a system in a chronological sequence of interactions between different elements (e.g., components and/or objects) of the system that will be driven by the software program. For example, the software program to be developed is software for an embedded system. The metadata tagging module 204 is configured to tag metadata in the UML diagram of the specification. The metadata is tagged to one or more elements (e.g., components or objects of components) of the system in the UML diagram to enable representation of the source code in a modeling language (e.g., a UML). A software engineer may tag the metadata to the one or more elements during upon generating the sequence diagram of the specification.

The code generator 206 is configured to generate a source code of the software program including logging statements using the UML diagram. In an exemplary implementation, the code generator 206 is configured to generate the source of the software program in a procedural programming language such as C. During generation of the source code, the code generator 206 is configured to append logging statements at one or more locations in the source code based on the metadata tagged to the UML diagram of the specification. The logging statements are inserted in the source code to log interactions between various the elements of the system during execution of the source code. The interactions are logged for the elements which are tagged in the UML diagram.

The code execution module 208 is configured to execute the source code with the logging statements. The code generator module 208 is also configured to generate log files during execution of the source code based on the logging statements. In some embodiments, the code generator 208 is configured to determine interactions between the elements of the system based on the logging statements during execution of the source code. In these embodiments, the code generator 208 is configured to log the interactions between the elements of the system in the log files in a chronological sequence.

The sequence diagram generator 210 is configured to generate the representation of the source code in the modeling language based on the interactions logged in the log files during execution of the source code. In some embodiments, the sequence diagram generator 210 is configured to generate a UML diagram based on the interactions logged in the log files. For example, the sequence diagram generator 210 is configured to generate a sequence diagram indicating the interactions between the elements of the system in a chronological sequence. The interactions between the elements indicate behavior of the system when the source code is executed in real-time.

The verification module 212 is configured to verify the source code of the software program based on the UML diagram generated by the sequence diagram generator 210. In some embodiments, the verification module 212 is configured to compare the UML diagram generated using the log files with the UML diagram of the specification. Based on the comparison, the verification module 212 is configured to determine whether the source code is in compliance with the specification of the software program. That is, the verification module 212 is configured to determine whether the behavior of the system according to the UML diagram generated using the log files is same as the behavior of the system according to the UML diagram of the specification. In case the source code is found to be non-compliant with the specification, the verification module 212 is configured to alter the source code at appropriate locations in such a manner that the source code complies with the specification.

Figure 3:
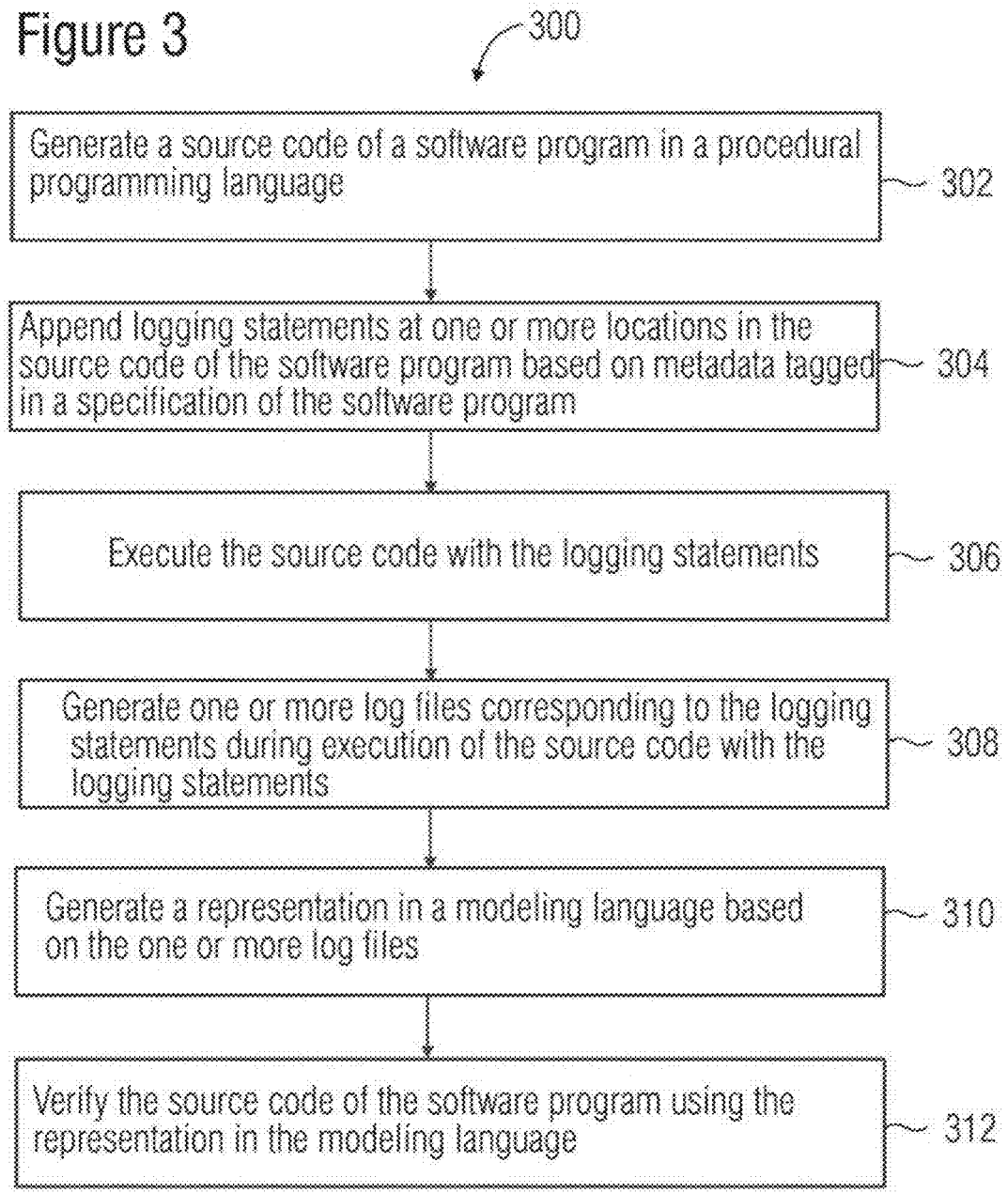
FIG. 3 illustrates a process flowchart of an exemplary method of verifying a software program in an integrated-development environment, according to an embodiment.

FIG. 3 illustrates a process flowchart 300 of an exemplary method of verifying a software program in an integrated-development environment, according to an embodiment. At step 302, a source code of a software program is generated in a procedural programming language using a specification of the software program. For example, the source code is generated using the 'C' programming language. Also, the specification of the software program is represented using a sequence diagram. At step 304, logging statements are appended at one or more locations in the source code of the software program based on metadata tagged in the specification of the software program (e.g., the sequence diagram of the specification). The logging statements are inserted in the source code to log interactions between various the elements of the system during execution of the source code. The interactions are logged for the elements which are tagged in the sequence diagram. The logging statements are in the form of instrumented code which includes tagged components and methods with appropriate names.

Consider that a software program is to be written for a ticketing system. For example, the software program may be for automatically issuing a ticket upon successful authorization of a payment via card. The user develops a specification for issuing a ticket via a kiosk using card payment in the form of components (e.g., ticketing system), objects (e.g., ticket server, kiosk, payment gateway, card authorization, ticket counter, etc.) and interaction between the objects using domain specific languages. A C-code corresponding to the specification is generated using an automatic code generator. The logging statements corresponding to tagged components, objects, and interactions between the objects in the specification are added at appropriate locations in the C-code. An exemplary C-code with logging statements for the ticketing system is shown in Appendix 'A'.

At step 306, the source code with the logging statements is executed. For example, the source code corresponding to test cases is executed. The test cases replicate use cases defined by the sequence diagram. At step 308, one or more log files are generated based on the logging statements during execution of the source code. The instrumented code corresponding to the logging statements logs information in the one or more log files. The information contains represents order of interactions between elements of a system that will be controlled by the software program in a chronological sequence as captured during execution of the source code. The information is captured in the form of running object information of a component (or class), tagging details of methods and components, method call information such as how the method call happened, which component or which object of the component initiated the method call, etc. Exemplary log information representing interaction between elements of a ticketing system in an extended mark-up language (XML) format is provided in Appendix 'B'.

At step 310, a representation of the source code in a modeling language (e.g., unified modeling language) is generated based on the information logged in the one or more log files. For example, a sequence diagram specifying the interactions between the elements of the system captured during the execution of the source is generated using the log files. An exemplary sequence diagram 500 generated based on the log information of the ticketing system is depicted in FIG. 5. The sequence diagram depicts the components, objections of the components and interactions between the objects in the ticketing system logged in the log files during execution of the C-code with the logging statements.

At step 312, the source code of the software program is verified using the representation of the source code in the modeling language. In other words, the sequence diagram generated at step 310 is compared with the sequence diagram representing the specification of the software program. Based on the comparison, it is determined whether the generated sequence diagram is matching the sequence diagram of the specification. This helps to determine whether the source code of the software program is in compliance with the specification of the software program. If the generated sequence diagram does not match with the sequence diagram of the specification, then it implies that the behavior of the system as determined from the execution of the source code is different from desired behavior of system defined by the specification. In such a case, the source code is altered at appropriate locations in the source code in such a manner that the altered source code complies with the specification of the software program. Then, the altered source code with the logging statements is executed, and log files indicating interactions between the elements of the system are generated by executing the altered source code. Accordingly, a UML diagram is generated using the log files, and the altered source code is verified using the generated UML diagram. The above steps are performed until the altered source code complies with the specification. In this manner, a software program is verified in an integrated development environment.

Figure 4:
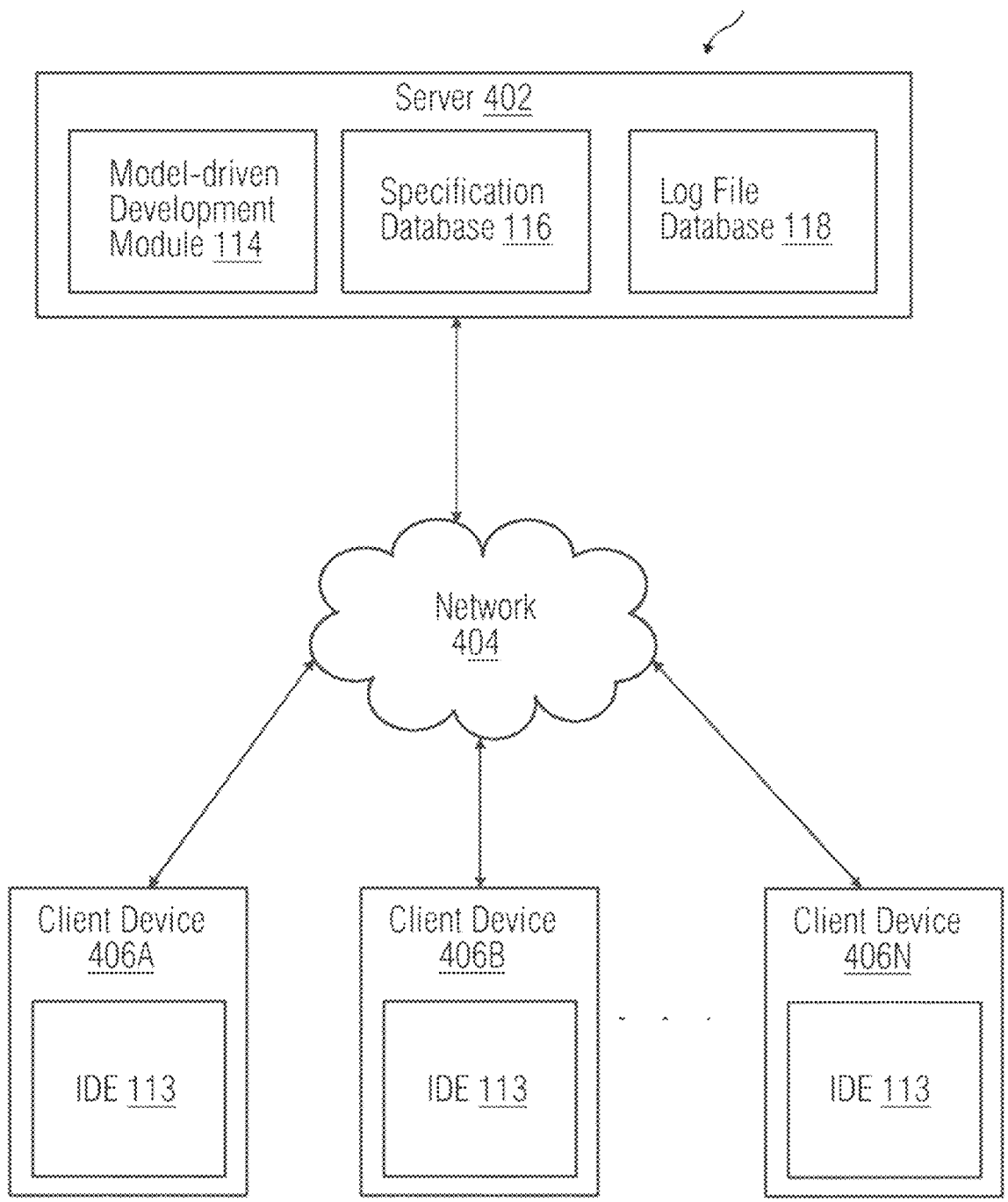
FIG. 4 illustrates a block diagram of another data processing system in which an embodiment can be implemented.

FIG. 4 illustrates a block diagram of another data processing system 400 in which an embodiment can be implemented. Particularly, the data processing system 400 includes a server 402 and a plurality of client devices 406A-N. Each of the client devices 406A-N is connected to the server 402 via a network 404 (e.g., Local Area Network (LAN), Wide Area Network (WAN), Wi-Fi, etc.). The data processing system 400 is another implementation of the data processing system 100 of FIG. 1, wherein the model-driven development module 114 resides in the server 402 and is accessed by client devices 406A-N via the network 404.

The server 402 includes the model-driven development module 114, the specification database 116, and the log files database 118. The server 402 may also include a processing unit, a memory, and a storage unit. The model-driven development module 114 may be stored on the memory in the form of machine-readable instructions and executable by the processing unit. The specification database 116 and the log files database 118 may be stored in the storage unit. The server 402 may also include a communication interface for enabling communication with client devices 406A-N via the network 404.

When the machine-readable instructions are executed, the model-driven development module 114 causes the server 402 to generate a source code of a software program including logging statements, generate log files during execution of the source code, generate a representation of the source code in a modeling language using the log files, and verify the source code using the representation of the source code in the modeling language. Method steps performed by the server 402 to achieve the above-mentioned functionality are described in greater detail in FIGS. 2 and 3. The client devices 406A-N include the integrated-development environment (IDE) 113 which enable software engineers to access the model-driven development module 114 in the server 402 to generate and verify a software program in the manner described above.

One can envision that, the model-driven development module 114 may reside in a cloud server in a cloud computing environment, wherein the client devices 406A-N connected via a cloud network may access the model-driven development module 114 to generate and verify a software program using modeling language diagrams.

In various embodiments, methods and systems illustrated in FIGS. 1 to 4 enable verification of a software program by comparing a sequence diagram generated based on execution of a source code with a sequence diagram of a specification of the software program. The methods and system can verify compliance of large and complex source code with the specification.

It is to be understood that the system and methods described herein may be implemented in various forms of hardware, software, firmware, special purpose processing units, or a combination thereof. One or more of the present embodiments may take a form of a computer program product including program modules accessible from computer-usable or computer-readable medium storing program code for use by or in connection with one or more computers, processing units, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processing units and program code for implementing each aspect of the technology can be centralized or distributed (or a combination thereof) as known to those skilled in the art.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

APPENDIX 'A'

```
exported component cardAuthorization extends nothing {
    Tag Component: cardAuthorization –> cardAuth
    requires insertCard
    provides cardStatus
    boolean cardStatus cardAuthorized( ) <= op card-
Status.cardAuthorized {
                return insertCard.cardinserted( ) && insert-
Card.cardAuthorized( );
            } runnable cardStatus cardAuthorized
} component cardAuthorization
 exported mock component cardInserted report messages: true{
        provides insertCard
}
exported component kiosk extends nothing {
    Tag Component: kiosk–> kiosk2
    requires cardStatus
    requires tktDetails ticketDetails
    provides OfferSeat offerSeat
    provides submitOrder submitOrde
    rrequires paymentSuccesful
    string offerSeat confirmSeats( ) <= op offer-
Seat.confirmSeats {
        if (paymentSuccesful.paymentStatus( )&& card-
Status.cardAuthorized( )) {
            return "you have been assigned seats 13A and 13B, good luck!";
            } else {
                return "payment failed, Adios!";
            } if
        } runnable offerSeat_confirmSeats
        boolean submitOrder_submitOrder( ) <= op submitOr-
```

APPENDIX 'A'
-continued

```
der.submitOrder {
                return false;
        } runnable submitOrder_submitOrder
    } component kiosk
    exported component ticketDetails extends nothing {
    provides tkttDetails ticketDetails
    init uint8 noOfSeats;
    date structDate = {1, 11};
    uint8 ticketDetails noOfSeats( ) <= op ticketDe-
tails.noOfSeats {
        return noOfSeats;
    } runnable ticketDetails noOfSeats
    date ticketDetails_pickDate( ) <= op ticketDetails.pickDate{ .
                return structDate;
    } runnable ticketDetails_pickDate
    } component ticketDetails
    exported component printer extends nothing {
                Tag Component: printer–> printer
                requires OfferSeat
    } component printer
```

APPENDIX 'B'

```
<SequenceDiagram><TestCasename="testTTicketCounteer"><Method
name="chargeAmount charge.Amount" isReturn="true"
instanceName="ticket server"
componentName="ticketServver"><Method
name="submitOrder" isReturn="true" instanceName="kiosk"
componentName="kiosk2"/></Method><Method name="offerSeat
confirmSeats" isReturn="true" instanceName="kiosk"
componentName="kiosk2"><Method
name="paymentSuccesful paymentStatus"isReturn="true"
instanceName="ticket server"
componentName="ticketServver"><Method
name="authorizationOK OK" isReturn="true"
instanceName="paymentGateway"
componentName="paaayment"/></Method><Method
name="cardStatus cardAuthorized" isReturn="true"
instanceName="cardAuthorization"
componentName="cardAuth"/></Method></TestCase><TestCase
name="testTicketCounteer"><Method
name="chargeAmountcharge.Amount"isReturn="true"
instanceName="ticket server"
componentName="ticketServver"><Method
name="submitOrder" isReturn="true"
instanceName="kiosk" componentName="kiosk2"/></Method><Method
name="offerSeat confirmSeats" isReturn="true"
instanceName="kiosk" componentName="kiosk2"><Method
name="paymentSuccesful paymentStatus"isReturn="true"
instanceName="ticket server"
componentName="ticketServver"><Method
name="authorizationOK OK" isReturn="true"
instanceName="paymentGateway"
componentName="paaayment"/></Method><Method
name="cardStatus cardAuthorized"isReturn="true"
instanceName="cardAuthorization"
componentName="cardAuth"/></Method></TestCase><TestCase
name="testCompositeComponentTicketCounter"/></SequenceDiagram
>
```

What is claimed is:

1. A computer-implemented method of verifying a software program in an integrated-development environment, the method comprising:

generating, by a processing unit, a source code of a software program comprising logging statements based on a specification of the software program, wherein the logging statements are appended at one or more locations in the source code of the software program based on metadata tagged in the specification of the software program, wherein the specification of the software program is represented in a modeling language, and wherein the specification of the software program specifies a behavior of a system in a chronological sequence of interactions between different elements associated with the system;
executing the source code with the logging statements;
determining one or more interactions between the different elements associated with the system based on the logging statements during execution of the source code;
logging, in one or more log files, the one or more interactions between the different elements of the system in a chronological sequence of interactions;
generating a representation of the source code in the modeling language using the one or more log files; and
verifying the source code of the software program using the representation of the source code in the modeling language.

2. The computer-implemented method of claim 1, wherein the source code of the software program is generated in a procedural programming language.

3. The computer-implemented method of claim 1, wherein the verifying of the source code of the software program comprises:
comparing the representation of the source code in the modeling language with the specification of the software program, wherein the specification of the software program is in the modeling language;
determining whether the source code of the software program is in compliance with the specification of the software program based on the outcome of comparison; and
altering the source code of the software program when the source code of the software program is not in compliance with the specification of the software program.

4. The computer-implemented method of claim 1, wherein the representation of the source code in the modeling language comprises a unified modeling language (UML) diagram.

5. A data processing system comprising:
a processing unit; and
a memory coupled to the processing unit, wherein the memory and the processing unit are configured to:
generate a source code of a software program comprising logging statements based on a specification of the software program, wherein the logging statements are appended at one or more locations in the source code of the software program based on metadata tagged in the specification of the software program, wherein the specification of the software program is represented in a modeling language, and wherein the specification of the software program specifies a behavior of the system in a chronological sequence of interactions between different elements associated with the system;
execute the source code with the logging statements;
determine one or more interactions between the different elements associated with the system based on the logging statements during execution of the source code;
log, in one or more log files, the one or more interactions between the different elements of the system in a chronological sequence of interactions;
generate a representation of the source code in the modeling language using the one or more log files; and
verify the source code of the software program using the representation of the source code in the modeling language.

6. The data processing system of claim 5, wherein the source code of the software program is generated in a procedural programming language.

7. The data processing system of claim 5, wherein, in the verifying of the source code of the software program, the memory and the processing unit are configured to:
compare the representation of the source code in the modeling language with the specification of the software program, wherein the specification of the software program is in the modeling language;
determine whether the source code of the software program is in compliance with the specification of the software program; and
alter the source code of the software program when the source code of the software program is not in compliance with the specification of the software program.

8. The data processing system of claim 5, wherein the representation of the source code in the modeling language comprises a unified modeling language (UML) diagram.

9. A non-transitory computer-readable storage medium, having instructions stored therein, which when executed by a data processing system, cause the data processing system to:
generate a source code of a software program comprising logging statements based on a specification of the software program, wherein the logging statements are appended at one or more locations in the source code of the software program based on metadata tagged in the specification of the software program, wherein the specification of the software program is represented in a modeling language, and wherein the specification of the software program specifies a behavior of the system in a chronological sequence of interactions between different elements associated with the system;
execute the source code with the logging statements;
determine one or more interactions between the different elements associated with the system based on the logging statements during execution of the source code;
log, in one or more log files, the one or more interactions between the different elements of the system in a chronological sequence of interactions;
generate a representation of the source code in the modeling language using the one or more log files; and
verify the source code of the software program using the representation of the source code in the modeling language.

* * * * *